US010781054B2

(12) United States Patent
Carpenter

(10) Patent No.: US 10,781,054 B2
(45) Date of Patent: Sep. 22, 2020

(54) SYSTEM AND METHOD FOR BELTED ARM DIVERT ACTUAL SPEED SENSING

(71) Applicant: Siemens Logistics LLC, DFW Airport, TX (US)

(72) Inventor: Michael D. Carpenter, Arlington, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 0 days.

(21) Appl. No.: 16/653,093

(22) Filed: Oct. 15, 2019

(65) Prior Publication Data

US 2020/0115170 A1 Apr. 16, 2020

Related U.S. Application Data

(60) Provisional application No. 62/746,151, filed on Oct. 16, 2018.

(51) Int. Cl.
*B65G 47/53* (2006.01)
*B65G 15/00* (2006.01)
*G05B 19/05* (2006.01)

(52) U.S. Cl.
CPC .......... *B65G 47/53* (2013.01); *B65G 15/00* (2013.01); *G05B 19/05* (2013.01); *B65G 2203/0291* (2013.01); *B65G 2203/042* (2013.01); *B65G 2811/095* (2013.01); *B65G 2812/02217* (2013.01); *G05B 2219/14001* (2013.01)

(58) Field of Classification Search
CPC ......... B65G 15/00; B65G 47/53; G05B 19/05
USPC ......... 198/358, 369.5, 370.01, 370.08, 370.1
See application file for complete search history.

(56) References Cited

U.S. PATENT DOCUMENTS

| | | | | |
|---|---|---|---|---|
| 5,655,643 A | * | 8/1997 | Bonnet | B65G 47/766 198/370.08 |
| 5,988,356 A | * | 11/1999 | Bonnet | B65G 47/766 198/369.5 |
| 6,536,580 B1 | * | 3/2003 | Fritzsche | B65G 47/766 198/370.07 |
| 6,585,262 B2 | * | 7/2003 | Nakanishi | B65G 47/29 198/460.1 |
| 6,607,065 B2 | * | 8/2003 | Peppel | B65G 47/766 198/367 |
| 6,868,957 B2 | * | 3/2005 | Cassoli | B65G 47/841 198/370.08 |
| 6,974,020 B1 | * | 12/2005 | Peppel | B65G 47/493 198/370.07 |
| 7,124,876 B2 | * | 10/2006 | Wolf | B65G 21/06 198/370.08 |
| 7,506,745 B1 | * | 3/2009 | McGuire | B65G 15/14 198/370.1 |

(Continued)

OTHER PUBLICATIONS

US 2020/0109010 A1, Carpenter, Apr. 9 (Year: 2020).*

*Primary Examiner* — Douglas A Hess

(57) ABSTRACT

A diverter system includes a conveyor belt with a horizontal belt surface, a diverter arm comprising a diverter belt with a vertical diverting belt surface, the diverter arm being operated by an actuator assembly, a sensing device for monitoring a speed of the vertical diverting belt surface, and a control unit operably coupled to the sensing device, wherein the control unit adjusts the speed of the vertical diverting belt surface according to a predefined ratio of speed between the horizontal belt surface and the vertical diverting belt surface.

20 Claims, 3 Drawing Sheets

(56) References Cited

U.S. PATENT DOCUMENTS

| | | | |
|---|---|---|---|
| RE41,360 E | 6/2010 | Peppel | |
| 7,819,233 B2 * | 10/2010 | Van Schaijk | B65G 47/766 |
| | | | 198/370.07 |
| 7,963,385 B2 * | 6/2011 | Sng | B65G 47/766 |
| | | | 198/367.1 |
| 8,312,980 B2 * | 11/2012 | Wilson | B65G 47/82 |
| | | | 198/370.07 |
| 8,616,361 B1 * | 12/2013 | Shankarbabu | B65G 47/766 |
| | | | 198/370.07 |
| 9,902,567 B1 * | 2/2018 | Zimmer | B65G 47/34 |

* cited by examiner

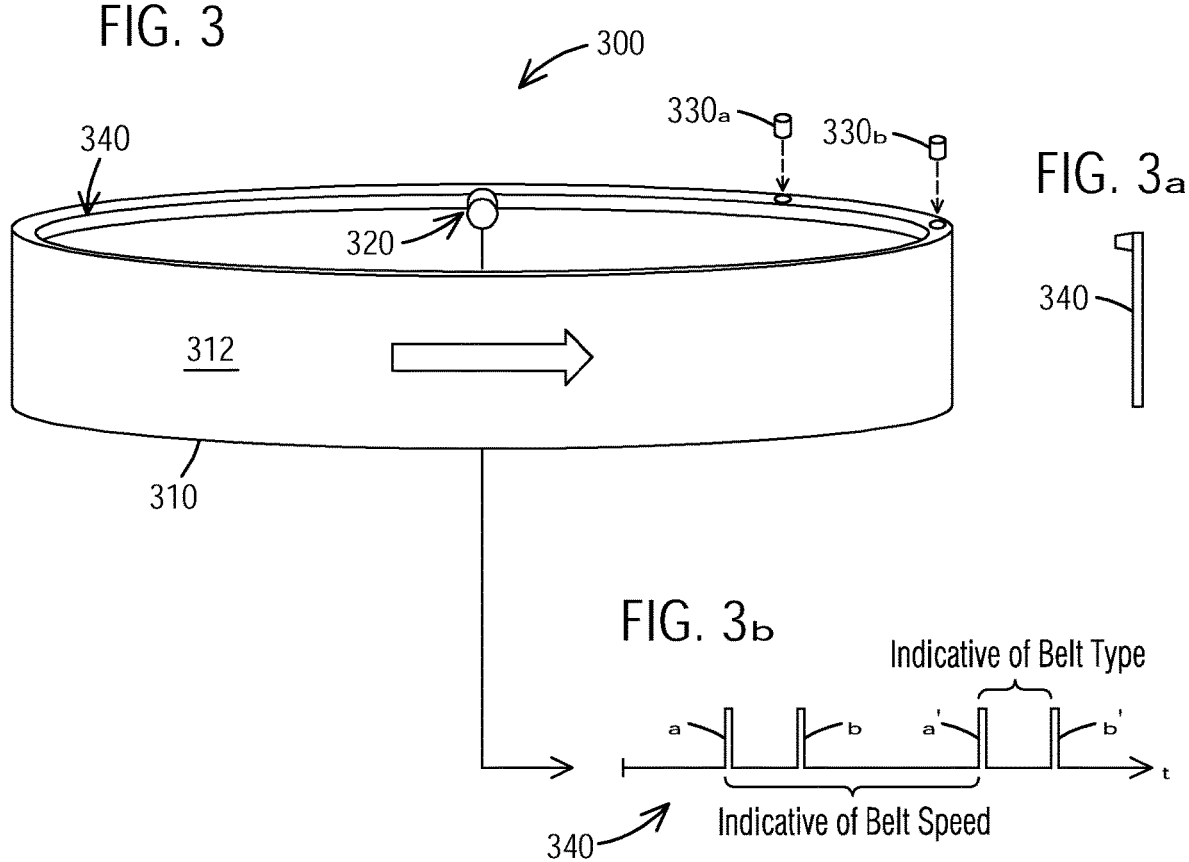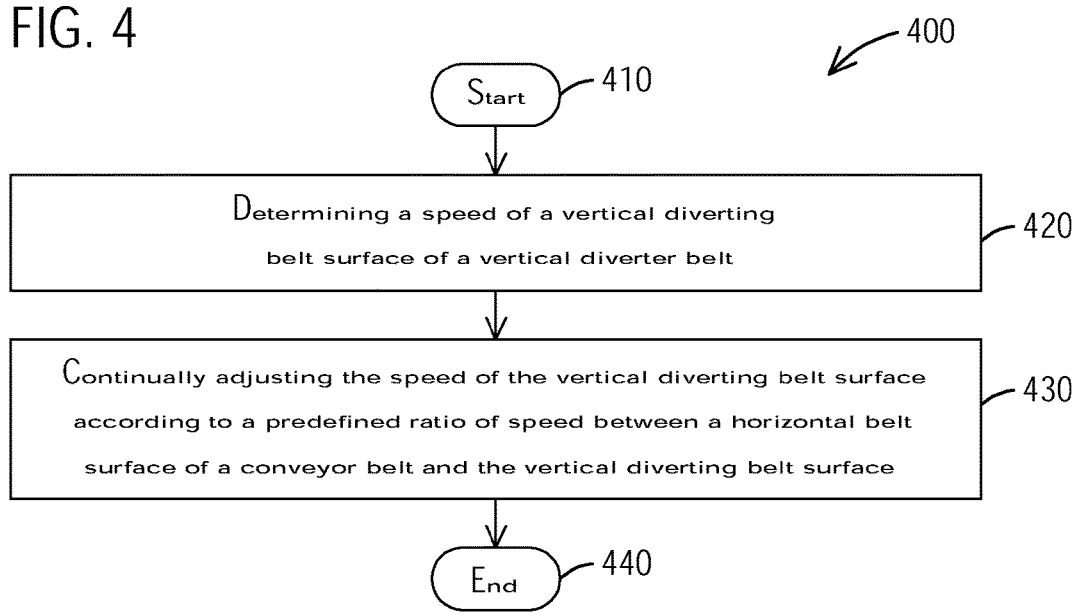

SYSTEM AND METHOD FOR BELTED ARM DIVERT ACTUAL SPEED SENSING

CROSS REFERENCE TO RELATED APPLICATIONS

This application claims benefit of U.S. provisional application No. 62/746,151 filed 16 Oct. 2018 in the United States Patent and Trademark Office, the content of which is herein incorporated by reference in its entirety.

BACKGROUND

1. Field

Aspects of the present disclosure generally relate to a diverter system and a method for operating a diverter system. Such a diverter system is particularly suitable for use in baggage handling and parcel sortation systems.

2. Description of the Related Art

A diverter system, such as a high speed diverter, herein also referred to as HSD, is used for example for sorting baggage horizontally from a conveyor onto another conveyor. The HSD may also be used to re-route baggage in case of failure. HSDs utilize for example dual, belted arms, also known as paddles, that may be extended or retracted to cross a horizontal transport conveyor at an angle. When extended, the belted arms cause items, typically luggage within a baggage handling system, to be diverted to an adjacent conveyor. The belted arms may be said to reciprocate, or move back and forth, as they either cause items to be diverted from the horizontal belt or pass through.

Such diverter systems require a complex configuration to establish a correct speed of the belts of the arms, the belts being vertically-mounted belt. A vertical diverting belt surface extends at an angle across a horizontal belt surface of the conveyor.

The speed of the angled vertical diverting belt surface should nominally be based on a speed of a horizontal belt surface of the conveyor divided by the cosine of the angle between the horizontal belt surface and the vertical belt surface. Variations on this approach typically involve operating the vertical belt surface faster than the formula just described, which may improve an orientation of bags that are diverted. If the vertical diverting belt surface operates at a speed slower than the formula just described, gaps between the items being diverted may increase, which could cause problems in very high throughput applications.

Once relative speeds are calibrated, generally a time-consuming and error-prone process, variations in friction, as commonly caused by variations in temperature in the equipment, which is often operated in environments that are not climate controlled, and variations in load cause variations in the relative speeds between the horizontal belt surface and the vertical diverting belt surface. In addition, these diverting systems, often installed in difficult to access areas, sometimes break or lose belts, particularly the vertical diverting belt(s). The function of the diverter system is seriously compromised in these situations. In summary, an ideal relationship between the speed of the horizontal belt surface and the vertical diverting belt surface is difficult to setup and maintain, which compromises the function of the diverter systems. Broken or missing belts are even more detrimental. Finally, modern conveyor systems are sometimes designed to run a reduced conveyor speed during periods of lower processing rate requirements as a power saving method. A high speed diverter with a set speed on the vertical belts would not be compatible with such a power saving method.

SUMMARY

A first aspect of the present disclosure provides a diverter system comprising a conveyor belt with a horizontal belt surface, a diverter arm comprising a diverter belt with a vertical diverting belt surface, the diverter arm being operated by an actuator assembly, a sensing device for monitoring a speed of the vertical diverting belt surface, and a control unit operably coupled to the sensing device, wherein the control unit is configured to adjust the speed of the vertical diverting belt surface according to a predefined ratio of speed between the horizontal belt surface and the vertical diverting belt surface.

A second aspect of the present disclosure provides a method for operating a diverter system comprising determining a speed of a vertical diverting belt surface of a diverter arm, and continually adjusting the speed of the vertical diverting belt surface according to a predefined ratio of speed between a horizontal belt surface of a conveyor belt and the vertical diverting belt surface.

A third aspect of the present disclosure provides a non-transitory computer readable medium storing computer executable instructions that when executed by at least one processor perform a method comprising determining a speed of a vertical diverting belt surface of a vertical diverter belt, and continually adjusting the speed of the vertical diverting belt surface according to a predefined ratio of speed between a horizontal belt surface of a conveyor belt and the vertical diverting belt surface.

BRIEF DESCRIPTION OF THE DRAWINGS

FIG. 3 illustrates a perspective view of a sensing device of a diverter system in accordance with an exemplary embodiment of the present disclosure.

FIG. 4 illustrates a flow chart of a method for operating a diverter system in accordance with an exemplary embodiment of the present disclosure.

DETAILED DESCRIPTION

To facilitate an understanding of embodiments, principles, and features of the present disclosure, they are explained hereinafter with reference to implementation in illustrative embodiments. In particular, they are described in the context of being a diverter system and a method for operating a diverter system. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
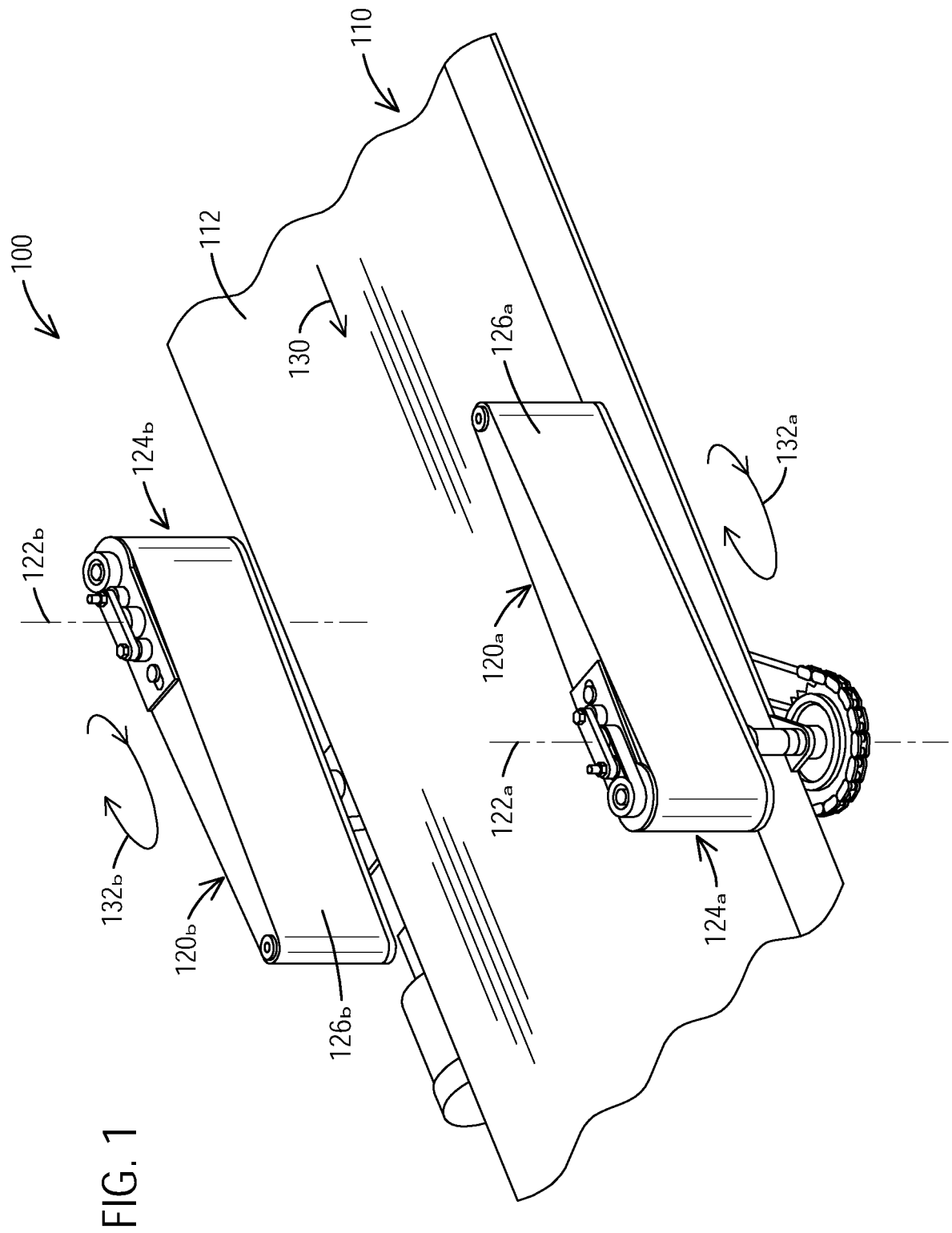
FIG. 1 illustrates a perspective view of a diverter system in accordance with an exemplary embodiment of the present disclosure.

FIG. 1 illustrates a perspective view of a diverter system 100 in accordance with an exemplary embodiment of the present disclosure. Diverter system 100 is suitable for high-speed applications. Diverter system 100 includes a generally horizontal conveyor belt 110 with a horizontal belt surface 112.

Diverter system 100 is configured as dual belted diverter arm system comprising a pair of diverter arms 120a and 120b. In order to divert articles from a conveying direction, illustrated by arrow 130, to a transfer direction, diverter arms 120a and 120b are actuated to pivot about their respective pivot axes 122a and 122b so that arms 120a, 120b are moved from home or non-diverting or retracted position adjacent conveying, horizontal belt surface 112 to a diverting or extended position in which at least a portion of the arms 120a. 120b extend over surface 114 and are generally aligned (see also FIG. 2).

When extended across surface 114, arms 120a, 120b generally align to form a substantially continuous fence or diverting surface. In addition, distal ends of the arms 120a, 120b are substantially adjacent so that there is little or essentially no space between the ends of arms 120a, 120b. When in their home or retracted positions (as illustrated), arms 120a, 120b are aligned adjacent surface 114 and are positioned outboard of the conveyor belt 112 to not interfere with a flow of articles along conveying direction 130.

Each diverter arm 120a, 120b comprises a generally vertical diverter belt 124a, 124b with a vertical diverting belt surface 126a, 126b. The diverter belts 124a, 124b with surfaces 126a, 126b are operated according to a specific speed, and directions of movement of the belt surfaces 126a, 126b are indicated by arrow 132a, 132b. The direction of movement 130 of the horizontal belt surface 112 corresponds to the direction of movement 132a, 132b of the vertical diverting belt surfaces 126a, 126b in order to provide high speed diverting.

Further examples and configurations of a dual arm diverter system are disclosed for example in U.S. Pat. No. RE41,360 E to Peppel which is incorporated by reference herein in its entirety.

Figure 2:
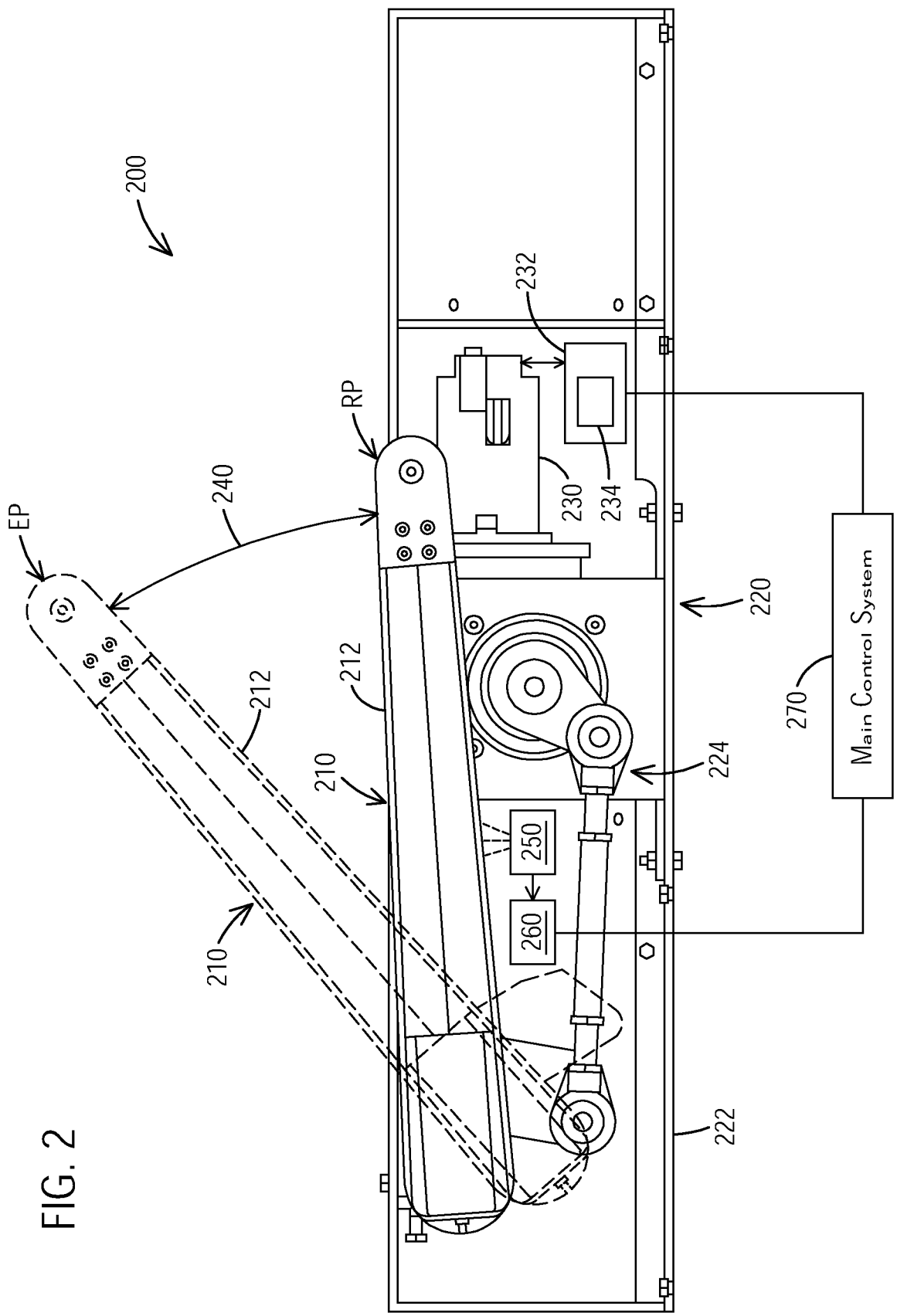
FIG. 2 illustrates a plan view of a diverter system in accordance with an exemplary embodiment of the present disclosure.

FIG. 2 illustrates a plan view of a diverter system 200 in accordance with an exemplary embodiment of the present disclosure. The diverter systems 100 and 200 can be used within baggage handling systems, for example at airports, parcel handling systems within mail processing facilities, or many other handling systems including for example automated sortation systems etc.

The diverter system 200 comprises a diverter arm or paddle 210 and an actuator assembly 220 for operating and moving the diverter arm 210. The diverter arm 210 and the actuator assembly 220 are configured such that the diverter arm 210 is moveable between a retracted (dwell) position RP (also known as home position) and at least one extended (dwell) position EP (also known as diverting position). Movement of the diverter arm 210 is illustrated by path 240.

In an embodiment, the actuator assembly 220, which operates the diverting arm 210, is housed in enclosure 222 and comprises a gearmotor 230 and a drive 232. The drive 232 is only illustrated schematically and may be integrated in the gearmotor 230 or may be a separate component. The gearmotor 230 is operably coupled to the diverter arm 210, and the drive 232 is configured to power and control the gearmotor 230. The gearmotor 230 comprises a plurality of stages, wherein an output stage functions as a shaft for turning or moving the diverting arm 210 from position RP to extended dwell position EP.

The diverter arm 210 is pivotally mounted for example adjacent a conveyor or other transporting means, such as a transporting belt. For diverting articles or objects, the diverter arm 210 is moved from the retracted dwell position RP to an extended dwell position EP, wherein the arm 210 moves across a surface of the conveyor or transporting means to divert objects or articles travelling on the surface in a diverting direction. For example, the diverting arm 210 is moved along path 240 up to a specific angle between RP and EP, for example an angle of about between 40° and 60°. The diverter arm 210 comprises a diverting belt 212 with an angled vertical belt surface.

In an embodiment, the gearmotor 230 comprises a servo motor, and the drive 232 comprises a variable frequency drive (VFD), for example a servo drive, operably coupled to the servo motor and powering and controlling the servo motor. The drive 232 can be integrated in the gearmotor 230 and generally provides speed adjustments, for example for belts or other means that operate or move the diverting arm(s) 210.

In an example, the actuator assembly 220, specifically the drive 332, comprises a control unit 234 storing computer executable instructions, executable by at least one processor, for example to adjust speeds of the gearmotor 230 and thereby moving the stages (gears) of the gearmotor 230 and moving the diverting arm 210.

As described before, the diverting arms 116a, 116b of diverter system 100, see FIG. 1, and the diverting arm 210 of system 200 comprise diverting belts 124a, 124b, 212 with an angled vertical diverting belt surface 126a, 126b. A speed of the angled vertical diverting belt surface 126a, 126b is nominally based on a speed of the horizontal belt surface 112, see FIG. 1, divided by the cosine of the angle between the horizontal belt surface 112 and the vertical belt surface 126a, 126b. Once relative speeds are calibrated, variations in friction, as commonly caused by variations in temperature in this equipment, which is often operated in environments that are not climate controlled, and variations in load cause variations in the relative speeds between the horizontal belt surface 112 and the vertical diverting belt surface 126a, 126b. In addition, the diverter systems 100, 200, often installed in difficult to access areas, sometimes break or lose belts, particularly the vertical diverting belt(s) 124a, 124b, 212.

Thus, in accordance with an exemplary embodiment of the present disclosure, a diverter system, which can be diverter system 100 or diverter system 200, comprises a sensing device 250 for monitoring a speed of the vertical diverting belt surface of the vertical belt 212 or 126a, 126b, and a control unit 260 operably coupled to the sensing device 250, wherein the control unit 260 is configured to adjust the speed of the vertical diverting belt surface according to a predefined ratio of speed between the horizontal belt surface and the vertical diverting belt surface.

The sensing device 250 is configured to measure or determine a speed of the vertical diverting belt 212, for example during operation of the vertical belt 212. The control unit 260 is configured to adjust the speed of the vertical diverting belt surface according to a predefined ratio of speed between the horizontal belt surface and the vertical diverting belt surface. Specifically, the control unit 260 is configured to adjust the speed of the vertical diverting belt surface of vertical belt 212 in response to a measurement of sensing device 250.

In an example, when the diverter arm 210 is in operation, the sensing device 250 measures or monitors, periodically or continually, the speed of the vertical belt 212 and belt surface. The measured speed is then evaluated according to a predefined ration of speed between the horizontal belt surface 112 of conveyor belt 110 and the vertical diverting belt surface of vertical belt. When the speed of the vertical belt 212 is too low or too high, according to the predefined ratio, the control unit 260 is configured to continually or periodically adjust the speed of the vertical diverting belt surface during operation of the diverter arm 210.

In an embodiment, the sensing device 250 comprises a stationary sensor mounted to the diverter system 200 such that the speed of the vertical diverting belt surface is measurable in an extended position EP and/or in a retracted position RP of the diverter arm 210. The example of FIG. 2 illustrates that the speed of diverting belt 212 is measured when the diverter arm 210 is in the retracted position RP.

The stationary sensor comprises for example an optical sensor, such as an electro-optical sensor, or a rotary encoder or a tachometer. The stationary sensor is affixed to the diverter system 200, for example to the enclosure 222 or other suitable location to measure the speed of the diverting belt 212. It should be noted that the diverter system 100, 200 may comprise more than one sensing device 250 positioned at different locations.

Since the measured vertical belt speed is evaluated according to the predefined ration of speed between the horizontal belt surface of conveyor belt and the vertical diverting belt surface of vertical belt, i.e., in order to determine whether the vertical belt 212 is too fast or too slow, a speed of the horizontal belt surface of the conveyor belt and an angle of the vertical belt surface with respect to the horizontal belt surface must also be determined or provided. For example, the diverter system 200 may comprise a sensor, such as an optical sensor, or rotary encoder or tachometer or other suitable means to measure a speed of the horizontal conveyor belt surface. Similarly, the diverter system 200 may comprise a sensor to measure an angle between the vertical belt surface and the horizontal belt surface, such as for example position (angle) sensor configured to measure angles.

In another example, the speed of the horizontal belt surface of the conveyor belt and angle between vertical belt surface and horizontal belt surface may be assumed as constant with specific values. For example, the diverter system may be set to a predefined angle of about 45° between diverter arm and conveyor belt in an extended dwell position which is used for this calculation. Further, the conveyor belt may also have one or more predefined speeds which are used for this calculation.

As shown in FIG. 1, the diverter system 100 can comprise multiple diverter arms 120a, 120b and thus multiple sensing devices 250, wherein each diverter arm 120a, 120b can comprise one or more sensing devices 250. In this case, the control unit 260 may operably and communicatively be coupled to the multiple sensing devices 250.

The control unit 260 can be configured as local controller, for example a programmable logic controller, which is communicatively coupled to main control system 270 and/or control unit 234 of drive 232. This means that the control unit 260 can be a separate component and provides data and information to the main control system 270 and/or the control unit 234. The drive 232 adjusts the speed of the vertical diverting belt 212 via gearmotor 230. In another example, the control unit 260 can be integrated or incorporated in existing control equipment, for example control unit 234 of drive 232. In this case, the control unit 260 would not be connected to the main control system 270 but is directly integrated in the drive 232. The control unit 260 can be software or a combination of software and hardware. For example, the control unit 260 can be programmed into existing equipment, for example as software module into drive control unit 234 or other control and monitoring equipment of the diverter system 100, such as main control system 270.

Those of skill in the art will recognize that not all details are shown or described in the system 100 of FIG. 1. For example, the housing or enclosure 122 may house other components of the diverter system 100, such as arm belts and/or other mechanical or electromechanical components 224.

FIG. 3 illustrates a perspective view of a sensing device 300 of a diverter system in accordance with an exemplary embodiment of the present disclosure. The diverter system can be embodied for example as diverter system 100 or diverter system 200.

FIG. 3 illustrates a vertical diverting belt 310 with vertical diverting belt surface 312. In an exemplary embodiment, the sensing device 300 comprises a sensor 320 mounted to a diverter arm carrying the vertical diverting belt 310. The sensor 320 is stationary relative to the diverting belt 310 but moves with the diverting arm when the diverting arm changes dwell positions, e.g., extended dwell position and retracted dwell position. The sensing device 300 further comprises sensing members 330a, 330b, specifically first and second sensing members 330a, 330b, travelling or moving with the vertical diverting belt 310 such that the sensing members 330a, 330b pass over the sensor 320 during operation of the diverter arm.

In an example, the sensor 320 comprises a ferrite sensor and the first and second sensing members 330a, 330b comprise iron slugs arranged with a predefined distance on the belt 310. For example, the vertical belt 310 may be configured such that it comprises a tracking feature 340. The tracking feature 340 may include a circumferential edge or border which can receive and hold the sensing members 330a, 330b. FIG. 3a illustrates a side view of the tracking feature 340. Of course, the sensing members 330a, 330b may be attached to the vertical belt 310 in many other ways, for example are glued to the belt 310 or integrated into the belt 310.

Since diverter systems tend to incorporate multiple diverter arm lengths, according to for example a width of the conveyor belt to which they are installed, it is necessary for the control unit 260 to be able to discern a length class of the belt 310. In the embodiment of FIG. 3, the length class is communicated to the control unit 260 by means of a distinguishing arrangement of the sensing members 330a, 330b that are embedded into a feature of the belt 310. The sensing members 330a, 330b are arranged so that they pass over the ferrite sensor 320 in the belt path, and the signals 340 from the sensor 320 are provided to the control unit 260. Once the control unit 260 discerns the length class of the belt 310, an interval between repeated patterns of the signals 340 is indicative of the speed of the belt.

For example, the sensor 320 can provide timing signals 340 which are indicative of the belt speed and the belt type. FIG. 3b illustrates timing signals a, b, a', b', wherein the speed of the belt 310 can be determined by distance divided by time (s=d/t) via signals a, a'. The distance d is the distance between the first and second sensing members 330a, 330b, and the time t describes the interval between the first and second sensing members 330a, 330b when passing over the sensor 320. The signals a and b (or a' and b') are used to determine the class length of the belt, i.e. essentially a length of the belt.

In order to determine whether the vertical belt 310 is too fast or too slow, a speed of the horizontal belt surface 112 of the conveyor belt 110 and an angle of the vertical belt surface with respect to the horizontal belt surface 112 must also be determined (or provided), because the vertical belt speed is evaluated in view of the predefined ratio of speed between the horizontal belt surface and the vertical diverting belt surface. The speed of the horizontal belt surface 112 of the conveyor belt 110 and angle between vertical belt surface and horizontal belt surface may be assumed as constant with specific values. For example, the diverter system may be set to a predefined angle of about 45° between diverter arm and conveyor belt in an extended dwell position which is used for this calculation. Further, the conveyor belt may also have one or more predefined speeds which are used for this calculation. In another configuration, the diverter system 300 may comprise a sensor, such as an optical sensor, or rotary encoder or tachometer or other suitable means to measure a speed of the horizontal conveyor belt surface. Similarly, the diverter system 300 may comprise a sensor to measure an angle between the vertical belt surface and the horizontal belt surface, such as for example position (angle) sensor configured to measure angles.

When an error in the speed of the vertical belt 310 is identified, the speed is adjusted accordingly. For example, a frequency of the vertical belt 310 is adjusted up or down to continually minimize a degree of error. For example, the control unit 260 can provide output signals to the drive 232 controlling the gearmotor 230 which operates the diverter arm and vertical belt 310.

Further, there are several options to add hysteresis to the control loop in order to prevent oscillation of speed, excessive 'hunting', etc., including increasing the number of samples between correction steps, limiting a rate of change in a single correction step.

Excessive interval in the speed measurement, or inability to determine length class, are indicative of a missing belt, and a fault under these conditions is reported by one of the control systems, for example control unit 260 or main control system 270. In another embodiment, the speed of the vertical belt may be stored and responded to an error in speed in a 'state machine' design.

FIG. 4 illustrates a flow chart of a method 400 for operating a diverter system in accordance with an exemplary embodiment of the present disclosure. While the method 400 is described as a series of acts that are performed in a sequence, it is to be understood that the method 200 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

In an exemplary embodiment, the method may start at 410 and may comprise an act or process 420 of determining a speed of a vertical diverting belt surface of a vertical diverter belt, and an act 430 of continually adjusting the speed of the vertical diverting belt surface according to a predefined ratio of speed between a horizontal belt surface of a conveyor belt and the vertical diverting belt surface. At 440, the method 400 may end. Further, the method 400 may comprise an act of determining a class length of the vertical diverting belt.

In an embodiment, act 430, adjusting the speed of the vertical diverting belt surface comprises determining an error of the speed and increasing or decreasing the speed based on the error by a control unit. The control unit may comprise a programmable logic controller operably coupled to a drive of an actuator assembly for operating the vertical diverter belt, wherein the drive regulates or controls a frequency of the diverter belt to increase or decrease the speed.

Further, a non-transitory computer readable medium storing computer executable instructions that when executed by at least one processor is provided, wherein the computer executable instructions perform a method as described herein, such as for example method 400 for operating a diverter system.

The described systems and methods provide a cost-effective means of continuously calibrating a speed relationship in belted diverters that is difficult to correctly set, and which can change frequently, for example due to variations in load, temperature, friction etc. When the speed setting is incorrect, throughput can be limited, which sacrifices customer productivity. Similarly, when a vertical belt is lost or broken, performance is significantly degraded. Further, expenses associated with calibration and commissioning of the diverter system(s) are reduced using the described system and method.

While embodiments have been disclosed in exemplary forms, it will be apparent to those skilled in the art that many modifications, additions, and deletions can be made therein without departing from the spirit and scope of the disclosure and its equivalents, as set forth in the following claims.

The invention claimed is:

1. A diverter system comprising:
   a conveyor belt with a horizontal belt surface,
   a diverter arm comprising a diverter belt with a vertical diverting belt surface, the diverter arm being operated by an actuator assembly,
   a sensing device for monitoring a speed of the vertical diverting belt surface, and
   a control unit operably coupled to the sensing device,
   wherein the control unit is configured to adjust the speed of the vertical diverting belt surface according to a predefined ratio of speed between the horizontal belt surface and the vertical diverting belt surface.

2. The diverter system of claim 1, wherein the speed of the vertical diverting belt surface is adjusted in response to a measurement of the sensing device.

3. The diverter system of claim 2, wherein the control unit is configured to continually adjust the speed of the vertical diverting belt surface during operation of the diverter arm.

4. The diverter system of claim 1, wherein the sensing device comprises a stationary sensor mounted to the diverter system such that the speed of the vertical diverting belt surface is measurable in an extended position and/or in a retracted position of the diverter arm.

5. The diverter system of claim 4, wherein the stationary sensor comprises an optical sensor or a rotary encoder or a tachometer.

6. The diverter system of claim 1, wherein the sensing device comprises a sensor and sensing members, the sensing members travelling with the vertical diverting belt surface such that the sensing members pass over the sensor during operation of the diverter arm.

7. The diverter system of claim 1, further comprising means for measuring or providing the speed of the horizontal belt surface.

8. The diverter system of claim 1, wherein the control unit comprises a programmable logic controller operably coupled to a drive of the actuator assembly for operating the diverter arm, the drive regulating a frequency of the diverter belt.

9. The diverter system of claim 1, wherein the control unit is integrated into a drive of the actuator assembly for operating the diverter arm, the drive regulating a frequency of the diverter belt.

10. The diverter system of claim 1, wherein the control unit is configured to determine a class length and/or the speed of the vertical diverting belt.

11. A method for operating a diverter system comprising:
determining a speed of a vertical diverting belt surface of a vertical diverter belt, and
continually adjusting the speed of the vertical diverting belt surface according to a predefined ratio of speed between a horizontal belt surface of a conveyor belt and the vertical diverting belt surface.

12. The method of claim 11, wherein the speed of the vertical diverting belt surface is adjusted in response to a measurement of a sensing device.

13. The method of claim 11, wherein the speed of the vertical diverting belt surface is adjusted during operation of the vertical diverter belt.

14. The method of claim 11, wherein determining the speed of the vertical diverting belt surface comprises measuring the speed by a sensing device mounted to the diverter system.

15. The method of claim 14, wherein the sensing device comprises a stationary sensor mounted to the diverter system such that the speed of the vertical diverting belt surface is measurable in an extended position and/or in a retracted position of the diverter arm.

16. The method of claim 15, wherein the stationary sensor comprises an optical sensor or a rotary encoder or a tachometer.

17. The method of claim 11, further comprising:
determining a class length of the vertical diverting belt.

18. The method of claim 11, wherein adjusting the speed of the vertical diverting belt surface comprises determining an error of the speed and increasing or decreasing the speed based on the error by a control unit.

19. The method of claim 18, wherein the control unit comprises a programmable logic controller operably coupled to a drive of an actuator assembly for operating the vertical diverter belt, the drive regulating a frequency of the diverter belt to increase or decrease the speed.

20. A non-transitory computer readable medium storing computer executable instructions that when executed by at least one processor perform a method comprising:
determining a speed of a vertical diverting belt surface of a vertical diverter belt, and
continually adjusting the speed of the vertical diverting belt surface according to a predefined ratio of speed between a horizontal belt surface of a conveyor belt and the vertical diverting belt surface.

* * * * *